I. P. LIHME.
METHOD OF MAKING FLAKY SODIUM SILICATE.
APPLICATION FILED JULY 13, 1916.

1,403,556.

Patented Jan. 17, 1922.

WITNESSES=
O. M. Kappler.
Thos. H. Fay.

INVENTOR
Iens Pauli Lihme
BY Fay, Oberlin & Fay
ATTORNEYS

UNITED STATES PATENT OFFICE.

IENS PAULI LIHME, OF LAKEWOOD, OHIO, ASSIGNOR TO THE GRASSELLI CHEMICAL COMPANY, OF CLEVELAND, OHIO, A CORPORATION OF OHIO.

METHOD OF MAKING FLAKY SODIUM SILICATE.

1,403,556.   Specification of Letters Patent.   Patented Jan. 17, 1922.

Application filed July 13, 1916. Serial No. 108,980.

*To all whom it may concern:*

Be it known that I, IENS PAULI LIHME, a citizen of the United States, and a resident of Lakewood, county of Cuyahoga, and State of Ohio, have invented a new and useful Improvement in Methods of Making Flaky Sodium Silicate, of which the following is a specification, the principle of the invention being herein explained and the best mode in which I have contemplated applying that principle, so as to distinguish it from other inventions.

The production of sodium silicate in dry form has heretofore involved considerable difficulty, not only in the actual operation of drying, but also in the character of the product resulting from the evaporation of the solution. If such evaporation be attempted in an open receptacle, a film forms which tends to prevent the driving off of the water of the solution and at the ordinary boiling point of the water (212° F.) the silicate tends to disintegrate, with the precipitation of silica. The silicate, when produced in this way, moreover, is in the form of a hard cake, which is difficult to redissolve and otherwise inconvenient to handle and use.

The object of the present invention, accordingly, is to provide a method of drying sodium silicate solution, which will not only avoid the breaking down of the compound itself, but also produce the dried silicate in flaky form, that is, in the form of a light powder, which is much more convenient to handle than the cake, and which, for obvious reasons, will readily enter into solution when it is desired to redissolve the same incidentally to its further use. To the accomplishment of the foregoing and related ends, the invention, then, consists of the steps hereinafter described and particularly pointed out in the claims.

The annexed drawing and the following description set forth in detail one approved method of carrying out the invention, such disclosed mode, however, constituting but one of the various ways in which the principle of the invention may be used.

In said annexed drawing:—

Figure 1:
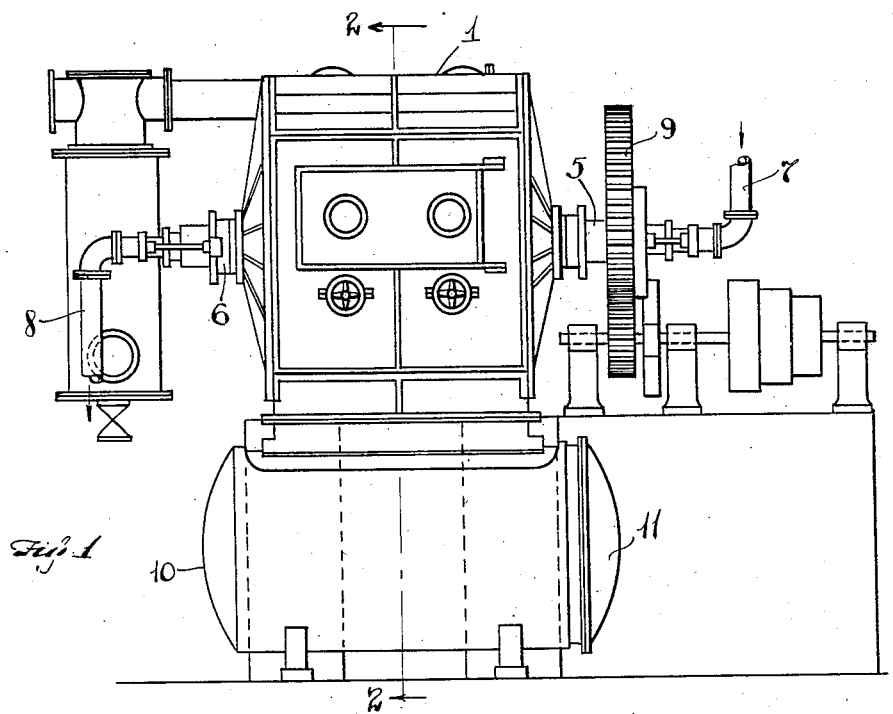
Figure 2:
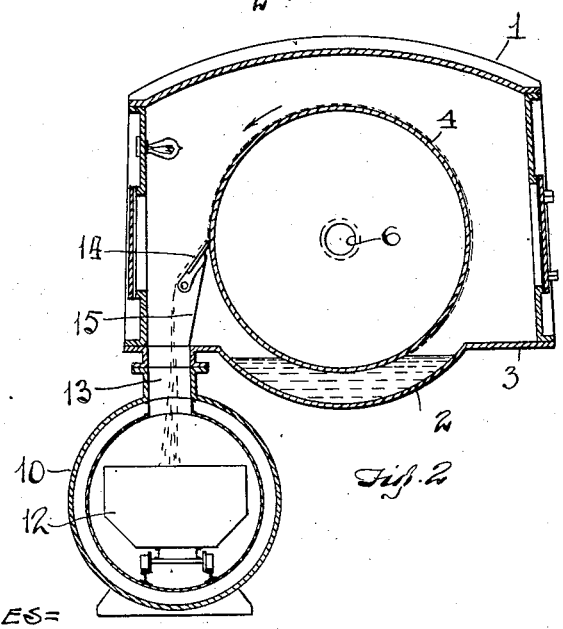

Figure 1 is a side elevational view of an apparatus adapted for the production of flaky sodium silicate in accordance with my present improved method; and Figure 2 is a transverse vertical section thereof taken on the plane indicated by the line 2—2, Figure 1.

The apparatus illustrated in the aforesaid drawing for carrying out my improved method, consists of a vacuum chamber 1, having a depressed portion 2 in its bottom wall, or floor 3, in which depression the sodium silicate solution may be placed, a continuous supply being preferably arranged for, so as to maintain the level of the liquid approximately constant. Rotatably mounted within said chamber is a drum 4, the ends 5 and 6 of which, forming the axles, project through the ends of the chamber, and being tubular, are connected with a steam supply line 7, and a steam exhaust line 8, respectively. Any suitable means for rotating the drum, such as the gear connections 9, shown at the right in Figure 1, may be utilized.

Supported at the proper level below chamber 1 is a second chamber 10, having a sealed connection therewith, and also provided with a removable sealing head 11 at one end, through which a car 12, or like movable container, may be admitted or withdrawn as desired.

Within the first-named chamber, directly above the opening 13, which constitutes the connection between it and the other chamber, is a pivotally supported scraper 14, the edge of which may be brought into contact with the surface of the drum as it rotates, so as to scrape therefrom any adhering material. A partition, or deflector plate 15, is located below and to the side of such scraper directed towards the drum, so as to cause any material thus removed to fall through the opening 13 into the car in the second chamber.

The mode of operation of the apparatus, in carrying out my method, should now be clear. In other words, upon admitting steam into drum 4 and properly reducing the pressure in the chamber 2, the liquid in the depressed portion 2 of the chamber's bottom will be caused to evaporate at a temperature considerably below boiling, such temperature preferably being around 180° F. As such liquid thus evaporates, a film of the dried material will adhere to the surface of the drum and be carried thereby until it contacts with the scraper, which removes the same and discharges it into the chamber below.

Incidentally to the removal of the film in the fashion just referred to, it is broken up into a light, dry, flaky powder, which is readily soluble in hot or cold water by reason of the form and character of such fragments and the fact that, at the temperature and under the conditions stated, the product is still in the hydrated form.

Other modes of applying the principle of my invention may be employed instead of the one explained, change being made as regards the method herein disclosed, provided the step or steps stated by any one of the following claims or the equivalent of such stated step or steps be employed.

I therefore particularly point out and distinctly claim as my invention:—

1. The method of making flaky sodium silicate, which consists in contacting a heated surface with a solution of such silicate in a suitable vacuum, whereby a film of the dry product is formed on such surface at a reduced temperature, and then removing such film from such surface and simultaneously breaking the same up into fine, light flakes, readily soluble in water.

2. The method of making flaky sodium silicate, which consists in continuously bringing fresh portions of a moving heated surface into contact with a solution of such silicate in a suitable vacuum, whereby a film of the dry product is formed on such surface at a reduced temperature, and continuously scraping such film from such surface, whereby such film is broken up into fine, light flakes, readily soluble in water.

3. The method of making flaky sodium silicate, which consists in continuously rotating a heated cylindrical surface so as to bring fresh portions thereof into contact with a solution of such silicate in a suitable vacuum, whereby a film of the dry product is formed on such surface at a temperature of approximately 180° F., and continuously scraping such film from such surface, whereby such film is broken up into fine, light flakes, readily soluble in water.

Signed by me, this 10th day of July, 1916.

IENS PAULI LIHME.

Attested by:—
W. T. CASHMAN,
M. H. MILLER.